United States Patent [19]

Schoenig, Jr. et al.

[11] Patent Number: 4,515,749
[45] Date of Patent: May 7, 1985

[54] SUBCRITICALITY MEASUREMENT APPARATUS AND METHOD

[75] Inventors: Frederick C. Schoenig, Jr.; James D. Landry, both of Wilmington, N.C.

[73] Assignee: General Electric Company, San Jose, Calif.

[21] Appl. No.: 587,445

[22] Filed: Mar. 8, 1984

Related U.S. Application Data

[63] Continuation of Ser. No. 295,322, Aug. 24, 1981, abandoned.

[51] Int. Cl.³ ............................................. G21C 17/00
[52] U.S. Cl. .................................... 376/254; 376/257; 376/259
[58] Field of Search ........................ 376/254, 257, 259

[56] References Cited

U.S. PATENT DOCUMENTS

| 3,636,353 | 1/1972 | Untermyer | 376/257 |
| 3,776,813 | 12/1973 | Corno | 376/257 |
| 4,024,017 | 5/1977 | Fleck | 376/257 |
| 4,325,785 | 4/1982 | Klotz et al. | 376/257 |

FOREIGN PATENT DOCUMENTS

| 666943 | 7/1963 | Canada | 376/257 |
| 1940914 | 2/1971 | Fed. Rep. of Germany | 376/257 |

Primary Examiner—Sal Cangialosi
Attorney, Agent, or Firm—Ivor J. James, Jr.; Samuel E. Turner; Raymond G. Simkins

[57] ABSTRACT

A method and apparatus for determining the subcriticality of masses of uranium by directing epithermal neutrons toward said mass, isolating said material from external thermal neutrons, and measuring the ratio of thermal and epithermal neutrons to epithermal neutrons which enables the establishment of a subcriticality value representative of the mass of uranium.

8 Claims, 3 Drawing Figures

SUBCRITICALITY MEASUREMENT APPARATUS AND METHOD

CROSS REFERENCE TO RELATED APPLICATION

This is a continuation of application Ser. No. 295,322, filed Aug. 24, 1981, now abandoned.

BACKGROUND OF THE INVENTION

This invention relates to the determination of subcriticality of uranium bearing materials during nuclear fuel production. In particular, it relates to the automatic determination of subcriticality or moderator concentration in uranium dioxide powder by a subcriticality measurement apparatus and method. The apparatus includes cadmium thermal neutron shields to facilitate and insure the accuracy of the subcriticality measurements. Measuring the moderator concentration is important, since moderators are effective for slowing or thermalizing fission-produced fast neutrons, which enable the establishment of a nuclear chain reaction.

Typical uranium fuel material comprises the isotope U-238 enriched in the order of 1–4 percent with the isotope U-235. Typical uranium containing fuel elements are shown, for example, by Specker et al in copending application Ser. No. 952,846, filed Oct. 19, 1978, now U.S. Pat. No. 4,285,769.

Uranium is typically stored in the form of uranium dioxide powder in five-gallon steel containers during the process of manufacturing nuclear fuel. To avoid any risk of the combined mass of uranium at any given location becoming critical—that is, capable of sustaining a nuclear chain reaction—the containers are stored individually and separated from one another at a considerable administrative and economic expense.

One difficulty encountered in securing criticality safety for a large number of stored uranium containers is the uncertainty of knowing the subcriticality of any given one of the containers. If the subcriticality of each container were conveniently and accurately determinable, then one could simply calculate the subcriticality of the overall system of individual containers with precision. Unfortunately, no such convenient and accurate measurement technique has been available prior to this invention. This has hampered the development of efficient storage and stockpiling techniques for uranium.

Individual uranium containers of the type utilized in nuclear fuel production are substantially subcritical under all moderator conditions. Accordingly, it is useful to speak in terms of subcriticality rather than criticality. For purposes of this disclosure, we need not speak of degrees of criticality, since the object of criticality safety programs is to prevent any degree of criticality in any portion of the uranium destined for use as reactor fuel.

Many variables enter the subcriticality calculation, including overall volume, structure, uranium density, enrichment, and of most concern with respect to this invention, the moderator concentration, which primarily involves moisture, or the water content found in the uranium. Uranium density, enrichment, and container volume or structure are generally relatively fixed parameters. The subcriticality parameter of most concern, however, the one susceptible of the greatest variation, is the moderator concentration.

Whatever its origin, the concentration of water in a mass of uranium stored for nuclear fuel production may vary from zero to over 100,000 parts per million. As will be seen, in the context of managing the storage of a system of plurality of uranium containers, a moderator concentration of over 20,000 parts per million is unacceptable for a given container and storage array geometry, which may for example include uranium dioxide contained in five-gallon cans. Of course, an individual container taken independently and separated from other like containers can be flooded with water and still be completely subcritical. A single five-gallon can in which the uranium is frequently stored, for example, is small enough to be subcritical even when submerged in water.

Destructive chemical analysis of samples to determine the subcriticality of each uranium container in a plant or storage area is impractible, since each container must then be opened, and a quantity of uranium is lost in the process. Furthermore, the results of such a chemical test may not be available for hours or even days.

Humidity sensors to measure subcriticality are, as a practical matter, inoperative in the high moisture or moderator environment involved. Moreover, conventional humidity sensors are typically effective to measure ambient humidity, but not the concentration of liquid water. Beyond this, many commercially available humidity sensors are simply unreasonably expensive.

OBJECTS OF THE INVENTION

Accordingly, it is an object of this invention to provide a swift, economical, and convenient measurement technique and apparatus for measuring the subcriticality of individual masses of uranium.

Another object of the instant invention is to provide a more economical stock management system for warehousing uranium dioxide powder used in manufacturing nuclear fuel rods for reactors.

Another object of the instant invention is to facilitate the cost-effective segregation of highly subcritical and moderately subcritical uranium dioxide powder and to permit selectively appropriate handling of the uranium in view of its subcriticality.

Another object of this invention is to enhance safety in laboratories and nuclear fuel processing facilities regarding the measurement of uranium moderator concentrations by non-destructive, non-chemical measurement thereof without compromising the closure integrity of sealed uranium dioxide containers.

Another object of the instant invention is to provide a measurement apparatus able to determine accurately the degree of uranium dioxide subcriticality in a sealed container by excluding or filtering out background thermal neutrons.

SUMMARY OF THE INVENTION

An apparatus and method are provided for accurately determining the subcriticality of a mass of uranium dioxide by excluding the presence of background thermal neutrons and by measuring the ratio of epithermal neutrons to thermal neutrons, which exit from the mass of uranium as a result of epithermal neutrons injected thereinto. Epithermal neutrons are used because they do not cause substantial fission of the U-235 or U-238. External thermal neutrons are barred by a shielding medium surrounding the uranium, which absorbs thermal neutrons. A pulsed or continuous neutron source is utilized to produce fast neutrons and these are moderated by a support structure for the neutron source, whereby a source of epithermal neutrons for injection into the mass of uranium is established. A thermal and epithermal neutron detector and a separate epithermal neutron detector, which is shielded from thermal neutrons by a cadmium shield, are positioned to detect the neutrons exiting from the mass of uranium and to provide resulting thermal-epithermal combined and epithermal neutron counts. The measured counts are stored in counters and are used to determine the subcriticality of the mass of uranium according to an epirically derived relationship. If the measurement indicates that the subcriticality of the mass of uranium exceeds a predetermined level, the operator segregates the particular uranium container from other containers, which prevents the risk of a critical chain reaction.

THE DRAWING

DESCRIPTION OF THE PREFERRED EMBODIMENT

Figure 1:
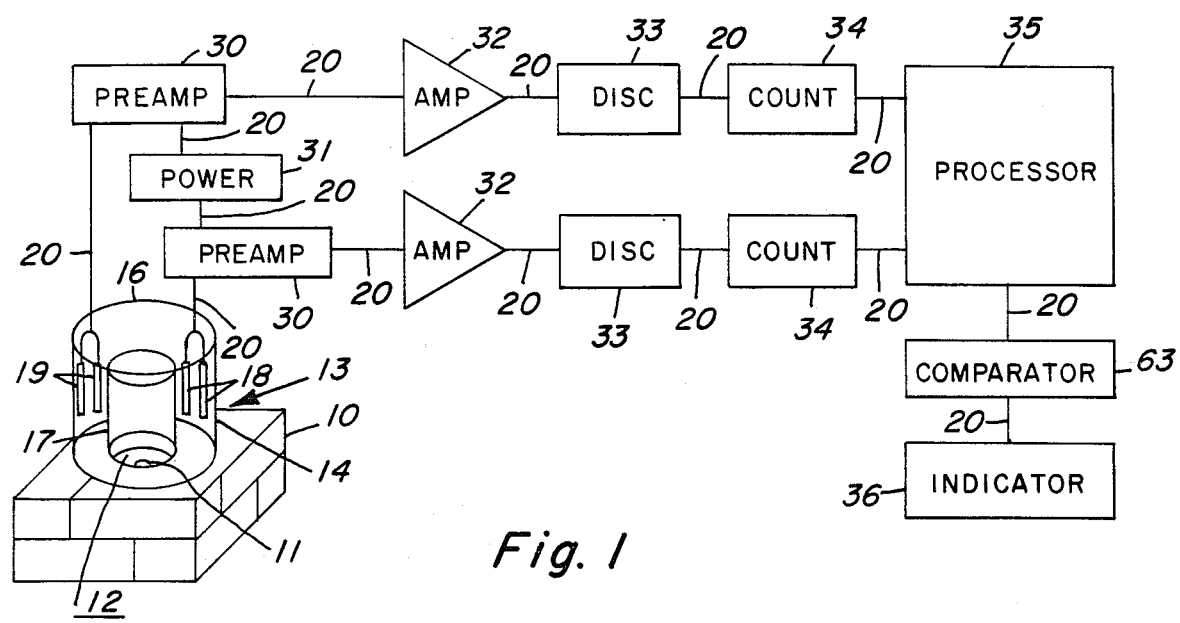
FIG. 1 is a schematic diagram of the subcriticality apparatus, including a container of uranium dioxide powder and a shield for excluding background thermal neutrons.

The preferred embodiment shown in FIG. 1 includes an assembly of layers of polyethylene bricks 10 supporting a fast neutron source 11 in a bay or recess 12 in the bricks. A neutron shield 13, including sides 14, and bottom 15, and preferably made of cadmium, rests on the polyethylene bricks 10. The top 16 is shown open. Within the shield 13 is a container 17 of a uranium material such as for example uranium dioxide powder to be examined for subcriticality. At least a single epithermal neutron detector 18 and a single combined thermal and epithermal neutron detector are suitably mounted near the container of uranium dioxide 17 and within the cadmium shield 13. For simplicity, the support structure for the neutron detectors is not shown. The neutron detectors 18, 19 as will be seen, are of the same type, but the epithermal detector 18 is shielded by a suitable material such as cadmium to exclude thermal neutrons. This apparatus injects epithermal neutrons into the container 17 by converting fast neutrons from the source 11 into epithermal neutrons.

The epithermal neutrons injected into the mass of uranium material have energy in the range above that of thermal neutrons which would cause substantial fission of the U-235 below the range of fast neutrons which would cause fission of the U-238. (The epithermal range or region of neutron energies is sometimes called the "resonance region" and the thermal region is sometimes called the "1/V region"). As shown by M. M. El-Wakil on pages 87–91 of "Nuclear Power Engineering", McGraw-Hill Book Company, 1962, U-235 has a relatively low fission cross section for neutrons in the epithermal or resonance region while U-238 is fissionable only by fast neutrons (above about $10^6$ ev). Thus the use of epithermal neutrons substantially avoids the extraneous neutrons that would result from fissions of the U-235 or U-238 and cause interference with the method of this invention.

FIG. 1 shows suitable coaxial electric cables 20, which connect each of detectors 18, 19, with a preamplifier 30, an amplifier 32, a discriminator 33, a counter 34, a processor 35 and an indicator 36. The power source 31 energizes the circuit elements just mentioned, and also the detectors 18, 19 each of which is essentially an anode and cathode establishing a high potential difference in a pressurized helium environment. When an incident neutron ionozes a helium atom, a current avalanche or pulse is generated and communicated to the preamplifier associated with the measuring detector 18 or 19.

System operation will be described in more detail below. However, it can be noted at this point that the current pulses established by the detector are amplified by the preamplifier 30 and amplifier 32 and selectively passed by the corresponding discriminator 33, to register as counts on the totalizer or counter 34. The relative number of thermal and epithermal counts registered provides the processor 35 with a basis for calculating subcriticality. The relationship involved for calculating subcriticality is derived hereinafter. The subcriticality determination made by processor 35 is shown on indicator 36, which may for example sound an audible alarm when the subcriticality is in the order of a predetermined threshhold, such as for example 20,000 parts per million of moderator.

Figure 2:
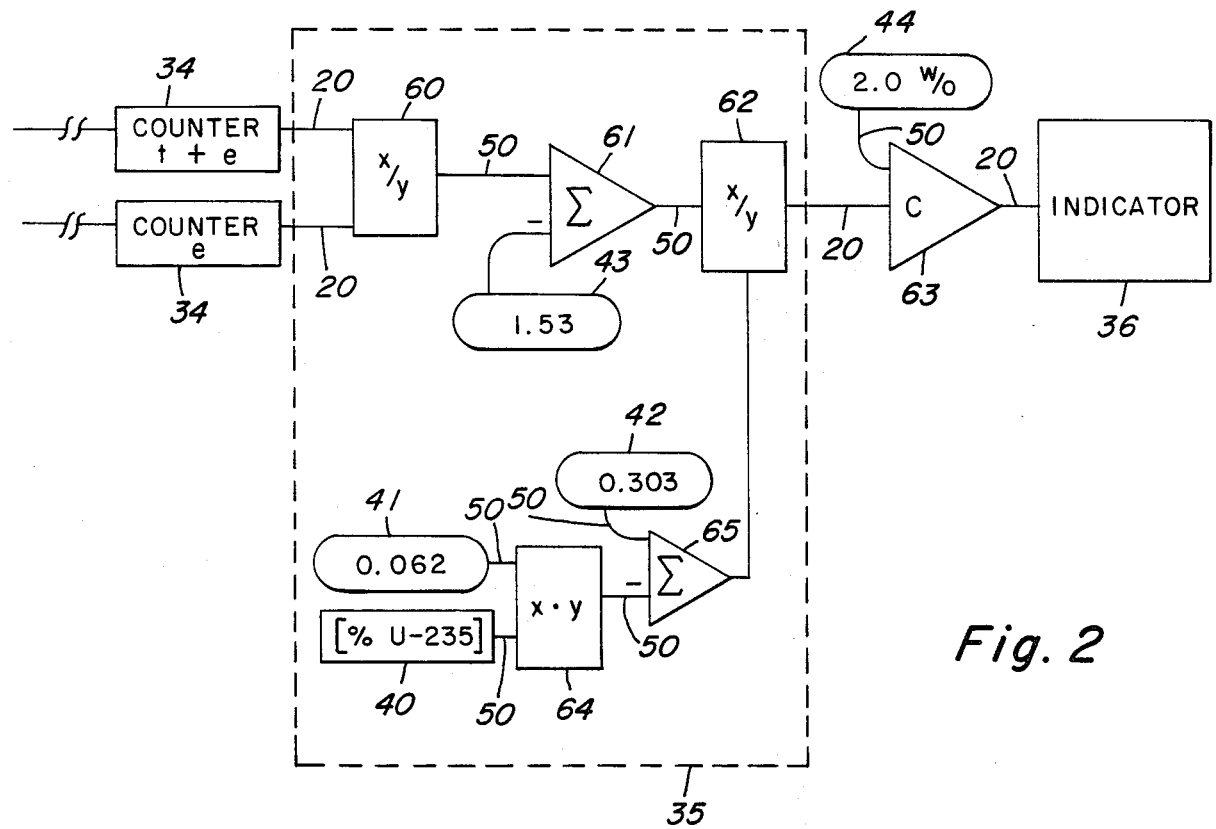
FIG. 2 is a schematic diagram of a circuit for determining subcriticality, which illustrates the functions of the processor shown in FIG. 1.

The subcriticality relationship of the best mode is implemented by the processor 35 shown in FIG. 2. This relationship can be solved in analog, as shown in FIG. 2, or it can be programmed on a suitable microprocessor, of which there are numerous kinds currently commercially available in the marketplace.

The relationship is empirically derived and can be represented in the following manner:

$$SI = \frac{(t/e) - b}{p + n[\% \ U\text{-}235]} \tag{1}$$

wherein:

SI represents the subcriticality value, t represents a measure of the thermal neutron count, e represents a measure of the epithermal neutron count, b is the ratio of thermal neutrons to epithermal neutrons at zero moderator concentration, n is the rate of change with respect to enrichment of the rate of change with respect to moderator of the ratio of thermal neutrons to epithermal neutrons (mathematically, this is: $\partial^2(t/e)/\partial[\%U\text{-}235]\partial[\%\ \text{moderator}]$),

[%U-235] is the enrichment concentration expressed as a percentage, and p is the rate of change of t/e with respect to moderator concentration for zero [%U-235].

The constants b, n, and p in the relationship above reflect lumped arithmetic values representative of the specific geometry utilized. The measured neutron count excludes fission neutrons, which are in a higher energy range.

As set forth in FIG. 2, the analog circuit equivalent to a program of the microprocessor receives the values of the counts in counters 34 over suitable electric leads. The numerical constants referred to above are input by applying fixed voltages according to the following table. These values represent the specific geometry of a single five-gallon can.

TABLE 1

| Input Number | Constant Value |
|---|---|
| 40 | [% U-235] |
| 41 | 0.062 |

TABLE 1-continued

| Input Number | Constant Value |
|---|---|
| 42 | 0.303 |
| 43 | 1.53 |
| 44 | 2.0 |

Various components are interconnected by suitable electric leads 50. These components include a first divider 60, a first adder 61, a second divider 62, a comparator 63, a multiplier 64, and a second adder 65. The comparator 63 can either digitally be represented in software on the microprocessor or in analog by a suitable commercially available discrete component. Referring to FIG. 2, it is seen that the divider 60 calculates the expression $[(t+e)/e]$ in relationship (1); the adder 61 completes the numerator of the relationship; multiplier 64 establishes the value of the product: $-0.062$ [%U-235]; adder 65 completes the denominator; and divider 62 calculates the resultant of the overall fraction of numerator and denominator. Then, the comparator 63 compares the output of the subcriticality relationship with a predetermined alarm threshhold, which in this case is two percent by weight, or the equivalent of 20,000 parts per million of moderator concentration. If the calculated subcriticality index SI exceeds the threshhold, a trigger signal along lead 20 to the indicator 36 causes an alarm to sound. When this happens, an operator can manually remove the offending (too highly moderated) container 17, which is then segregated from the remaining containers of uranium dioxide of lower moderator concentration, permitting differentiated, and consequently more efficient, safe warehousing and storage of the uranium containers.

The neutron source 11 of the preferred embodiment is for example a one curie americium beryllium source, in which the americium releases alpha particles by natural disintegration. In the case of americium 241, about $10^6$ neutrons per second are radiated as a result of the alpha particles colliding with beryllium atoms at the source. Other suitable source materials are californium 252 and plutonium beryllium. In the alternative, a pulsed neutron source such as for example a model A620 neutron generator by Kaman Sciences of Colorado Springs may be employed. The spectrum of neutron energies from the source 11 is fast (over 0.5 MeV).

In the case of americium beryllium, the source 11 is constructed for example as a thin disc or foil approximately ¼ inch in diameter and is suitably mounted in a lead cask, to shield operating personnel from undue radiation. The polyethylene bricks 10 mentioned above laterally surround and support the lead cask and define bay 12, which is open at the top. Fast neutrons accordingly radiate upwardly from the source directly into the uranium dioxide container 17. Other fast neutrons travel to the polyethylene bricks 10 and are moderated to the thermal or epithermal level. Some of these neutrons escape from the system; others return upwardly toward container 17. The upwardly traveling thermal neutrons are absorbed by shield 13. The fellow traveling epithermal neutrons proceed into the mass of uranium.

The shield 13 may be cylindrical in form. Other shapes or structures may be substituted as convenient. A door, suitably hinged or otherwise attached to the sides of the shield, may be provided, since the containers of uranium dioxide are heavy and their placement through the top may be inconvenient. For simplicity, the door is not shown in the drawing. The shield 13 prevents external(including source and background)- thermal neutrons from reaching the uranium container 17 and detectors 18, 19. The shield 13 is preferably constructed of 30 to 40 mil sheet cadmium available from commercial sources such as the Reactor Shielding Corporation. A coating or layer of plastic or stainless steel preferably covers the cadmium to prevent contamination of the uranium being examined.

Five-gallon steel cylindrical containers of standard commercial utility hold the uranium dioxide powder 17. Other container sizes may be utilized such as for example a large silo, say even as large as one having a volume up to 100 cubic meters.

Detectors 18, 19 of the 1/v type, such as for example helium-3 detectors, are employed in this embodiment. Such detectors include a sealed, gas-filled cylinder (not shown) and a suitably insulated central conductor constituting electrodes for impressing a high voltage across the gas. An incident neutron ionizes some of the gas, and the resulting electrons collected by the electrodes establish or generate a current pulse which is transmitted along coaxial cable 20 to the preamplifier 30. In this embodiment, the gas may be helium at a pressure of 10 atmospheres. A proportional counter or detector such as the Reuter-Stokes Model RS-P4-410-30 helium-3 detector may be employed.

Each epithermal detector 18 is shielded at its ends and on sides by a suitable cadimum shield which absorbs thermal neutrons and prevents their causing a reaction within the detector 18. The detectors 18, 19 are suitably mounted within the shield structure 13 surrounding the uranium dioxide 17 being examined, thereby preventing exposure to external thermal neutrons. If there are plural epithermal and combined detectors 18, 19, each kind is suitably electrically connected to a corresponding preamplifier 30.

On the average, the epithermal detectors 18 and the combined detectors 19 are given equal opportunity in the sense of being suitably positioned near the uranium 17 measured, to receive neutrons passing through the uranium dioxide 17 sampled. However, if no equal opportunity is provided, then a suitable correction is effected. As many or as few of each kind of detectors 18, 19 as desired may be employed in this invention.

The power supply 31 energizes the detectors 18, 19 and the electric circuitry calculating the subcriticality relationship may for example be a Canberra Model 3002, which may provide up to 3,000 volts in potential for the detectors. The preamplifiers 30—one of which is connected to each detector, or type of detectors 18, 19—convert the input current pulses received from the detectors 18, 19 into a low-voltage pulse transferred to corresponding adjustable gain amplifier 30 may for example be a Canberra Model 1706; the amplifier 32, and Canberra Model 2011.

Each discriminator 33 receiving the output of a respective amplifier 32 is setable to a suitable level above input noise. A suitable discriminator 33 is Canberra Model 2032.

The subcriticality relationship (1) set forth above has been empirically developed by testing samples of uranium of known moderator concentration and enrichment in the apparatus of FIG. 1. The thermal-epithermal counter established a combined "t+e" count and the epithermal counter provided an "e" count. This was divided and the number one was subtracted to establish the ratio of thermal to epithermal neutrons, as shown in the following relationships:

$$\frac{t+e}{e} = \frac{t}{e} + \frac{e}{e} = \frac{t}{e} + 1 \quad (2)$$

Subtracting "one" from $(t+e)/e$:

$$\frac{t+e}{e} - 1 = \frac{t}{e} + \frac{e}{e} - 1 = \frac{t}{e} \quad (3)$$

Accordingly, the count ratio t/e can be compared with the known moderator concentration in FIG. 1. This establishes the relationship in FIG. 3 between the thermal to epithermal neutrons has been determined for several moderator concentrations at different enrichments, including 0.71% U-235 and 3.80% U-235.

Figure 3:
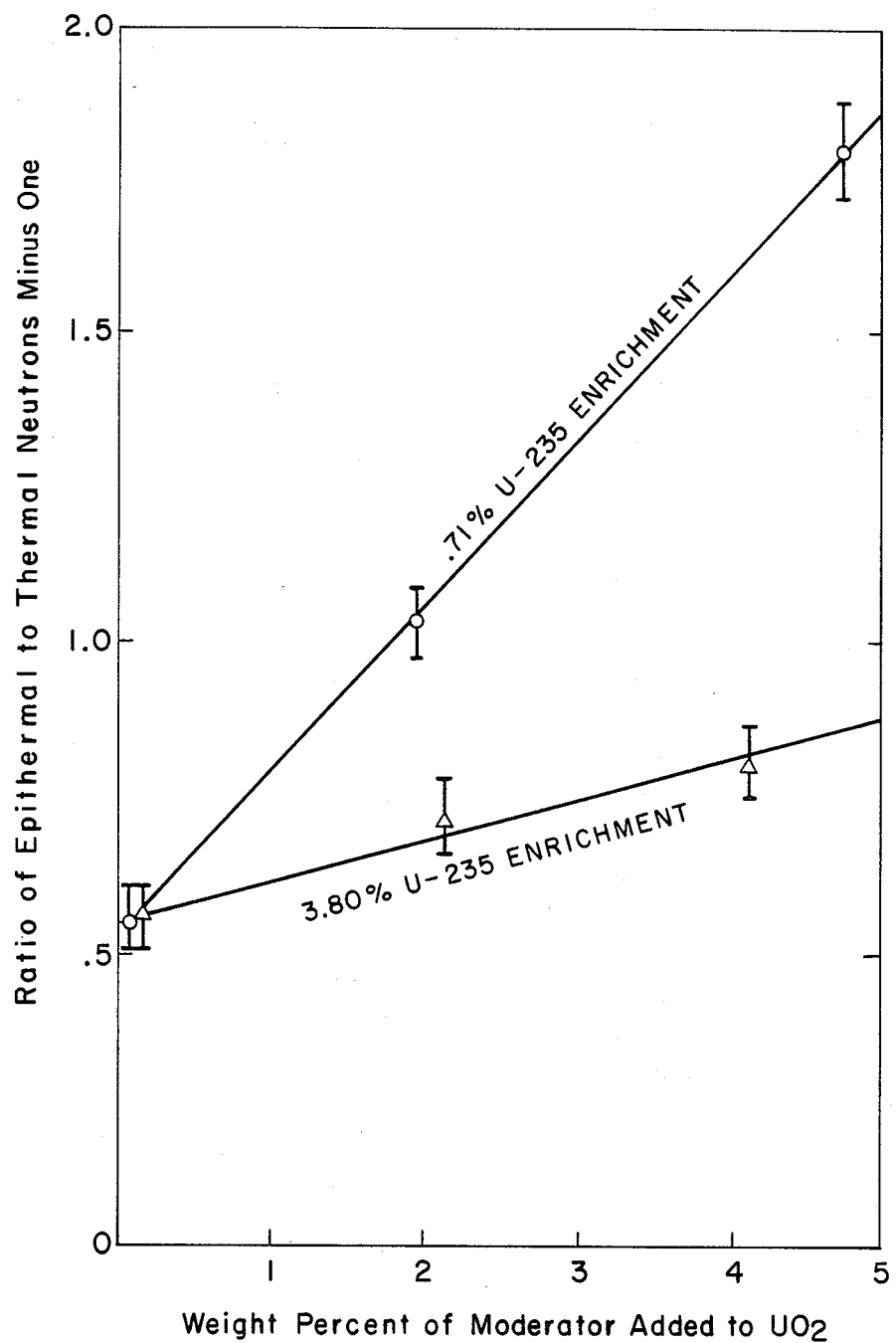
FIG. 3 is a graph illustrating the subcriticality relationship that will be discussed below.

Two assumptions have been made in order to develop the information of FIG. 3, namely that the ratio of thermal to epithermal neutrons (t/e) is linearly related to the moderator concentration [M], and that the relationship between the slope of the ratio (t/e) and [M] is a linear function of the enrichment [%U-235].

Accordingly to these assumptions, FIG. 3 shows that the ratio (t/e) is a linear function of [M] and m is a linear function of [%U-235]:

$$(t/e) = m[M] + b \quad (4), \text{ and}$$

$$m = n[\%U\text{-}235] + p \quad (5)$$

where,
t represents a measure of the thermal neutron count,
e represents a measure of epithermal neutron count,
m is the slope of the curve of the ratio of thermal-to-epithermal neutrons versus moderator concentration.
[M] is the moderator concentration in percent by weight,
b is the ratio of thermal neutrons to epithermal neutrons at zero moderator concentration,
n is the slope of the relationship between m and [%U-235] and is the same "n" as in equation (1),
[%U-235] is the enrichment concentration expressed as a percentage, and
is the rate of change of t/e with respect to moderator concentration zero [%U-235].

Eliminating "m" as a variable and substitution relationship (5) into relationship (4), it follows that:

$$[M] = \frac{(t/e) - b}{p + n[\% U\text{-}235]} \quad (6)$$

By definition, SI is the moderator concentration [M]:

$$SI = [M] \quad (7)$$

Accordingly:

$$SI = \frac{(t/e) - b}{p + n[\% U\text{-}235]} \quad (8)$$

FIG. 3 yields two equations of the form of relationship (3) and allows the constants below to be determined:

$$b = 0.53 \quad (9)$$

$$p = 0.303 \quad (10)$$

$$n = -0.062 \quad (11)$$

Substituting (9), (10), and (11) into (8):

$$SI = \frac{(t/e) - 0.53}{0.303 - 0.062[\% U\text{-}235]} \quad (12)$$

Since it is the combined thermal and epithermal count which is actually counted, the relationship (10) can be arranged:

$$SI = \frac{[(t/e)/e] - 1.53}{0.303 - 0.062[\% U\text{-}235]} \quad (13)$$

This relationship establishes the value 1.53 at input number 43 and provides the basis for the circuitry 35 in FIG. 2.

A single measurement cycle according to this invention takes minutes—much less then the hours required for conventional chemical test.

After reference to the foregoing, modifications of this invention may occur to those skilled in the art. However, it is to be understood that this invention is not intended to be limited to the particular embodiment shown and described herein, but is intended to cover all modifications coming within the spirit and scope of the invention as claimed.

We claim:

1. Apparatus for providing a subcriticality value SI as a function of the moderator concentration and enrichment concentration of a mass of uranium fuel material including the isotopes U-235 and U-238, comprising: a source of epithermal neutrons positioned for directing epithermal neutrons into said mass of uranium material, said epithermal neutrons having energy in a range above the range of thermal neutrons which would cause substantial fission of said U-235 and below the range of fast neutrons which would cause fission of said U-238 whereby fission of said isotopes and the extraneous neutrons that would result from such fission are substantially avoided; a first neutron detector positioned adjacent said uranium material and responsive to substantially only epithermal neutrons for providing a first detector signal e indicative of neutrons from said source traversing said mass of uranium material without substantial moderation; a second neutron detector positioned adjacent said uranium material and responsive to both thermal and epithermal neutrons for providing a second detector signal (t+e) indicative of the sum of the neutrons from said source traversing said mass of uranium material which are moderated to thermal energy by the moderator material in said mass of uranium material and the neutrons from said source traversing said mass of uranium material without substantial moderation; divider means connected to receive said first detector signal e and second detector signal (t+e) and responsive thereto for providing an output signal proportional to ratio of said second detector signal to said first detector signal, said ratio providing an indication of the concentration of moderator material in said mass; means for subtracting a factor (1+b) from said ratio of said detector signals (where b is the ratio of thermal neutrons to epithermal neutrons at zero moderator concentration) to provide a first factor; means for multiplying a factor n (the slope of the relationship between the curve of the ratio of thermal plus epithermal neutrons to epithermal neutrons versus moderator concentration) and the enrichment concentration of said mass of uranium material (expressed as the percent of U-235) to provide a second factor; means for subtracting from said second factor a factor p (which is the derivative of the enrichment concentration of the thermal to epithermal neutron ratio with respect to moderator concentration) to provide a third factor; and means for dividing said first factor by said third factor to provide said subcriticality value SI.

2. Apparatus of claim 1 further including means for comparing said subcriticality value SI to a predetermined threshold value and providing an alarm when said threshold value is exceeded.

3. The apparatus of claim 1 wherein said source provides a constant source of epithermal neutrons.

4. The apparatus of claim 1 wherein said source provides pulses of epithermal neutrons.

5. A method for providing a subcriticality value SI as a function of the moderator concentration and enrichment concentration of a mass of uranium material which includes the isotopes U-235 and U-238, including the steps of: directing epithermal neutrons from an epithermal neutron source into said mass of uranium material, said epithermal neutrons having energy in a range above the range of thermal neutrons which would cause substantial fission of said U-235 and below the range of fast neutrons which would cause fission of said U-238 whereby fission of said isotopes and the extraneous neutrons that would result from such fission are substantially avoided; positioning a first neutron detector adjacent said uranium material responsive to substantially only epithermal neutrons for providing a first detector signal e indicative of neutrons from said source traversing said mass of uranium without substantial moderation; positioning a second neutron detector adjacent said uranium material responsive to both thermal and epithermal neutrons for providing a second detector signal (t+e) indicative of the sum of the neutrons from said source traversing said mass of uranium material which are moderated to thermal energy by said moderator material in said mass and the neutrons from said source traversing said mass of uranium material without substantial moderation; determining the ratio of said second signal to said first signal whereby said ratio (t+e)/e is indicative of the concentration of said moderator material in said mass of uranium material; subtracting a factor (1+b) from said ratio (t+e)/e (where b is the ratio of thermal neutrons to epithermal neutrons at zero moderator concentration) to provide a first factor; multiplying a factor n (the slope of the relationship between the curve of the ratio of thermal plus epithermal neutrons to epithermal neutrons versus moderator concentration) and the enrichment concentration of said mass of uranium material (expressed as the percent of U-235) to provide a second factor; subtracting from said second factor a factor p (which is the derivative of the enrichment concentration of the thermal to epithermal neutron ratio with respect to moderator concentration) to provide a third factor; and dividing said first factor by said third factor to provide said subcriticality value SI.

6. The method of claim 5, wherein the subcriticality value is in the order of:

$$SI = \frac{[(t + e)/e] - 1.53}{0.303 - 0.062[\% \ U\text{-}235]}$$

7. The method of claim 5, including the further step of activating an alarm when the subcriticality index exceeds an alarm threshold.

8. The method of claim 7, wherein the alarm threshold is in the order of 20,000 parts per million of moderator.

* * * * *